United States Patent [19]

Tye

[11] Patent Number: 4,625,983

[45] Date of Patent: Dec. 2, 1986

[54] DEVICE FOR REDUCING SPLASH AND SPRAY FROM VEHICLES

[75] Inventor: Ronald G. Tye, Bishops Stortford, England

[73] Assignee: Minnesota Mining and Manufacturing Company, Saint Paul, Minn.

[21] Appl. No.: 370,924

[22] Filed: Apr. 22, 1982

[30] Foreign Application Priority Data

Apr. 28, 1981 [GB] United Kingdom ................ 8113030

[51] Int. Cl.$^4$ .............................................. B62B 9/16
[52] U.S. Cl. ............................................ 280/154.5 R
[58] Field of Search ....................... 280/154.5 R, 154; D12/184; 156/167, 176, 181

[56] References Cited

U.S. PATENT DOCUMENTS

| 2,605,119 | 7/1952 | Earnest | 280/154.5 R |
| 3,836,416 | 9/1974 | Ropiequet | 28/117 |
| 3,899,192 | 8/1975 | Reddaway | 280/154.5 R |
| 4,372,570 | 2/1983 | Goodall | 280/154.5 R |

FOREIGN PATENT DOCUMENTS

| 884204 | 12/1961 | United Kingdom . | |
| 2014525 | 8/1979 | United Kingdom | 280/154.5 R |

OTHER PUBLICATIONS

"Exhibit", Commercial Motor, May 26, 1984.

Primary Examiner—John J. Love
Assistant Examiner—Joseph G. McCarthy
Attorney, Agent, or Firm—D. M. Sell; J. A. Smith; C. Truesdale

[57] ABSTRACT

A non-woven, non-tufted skeletal mass of fibrous members in a mat-like structure for reducing liquid splash and/or spray in a region likely to be subjected to liquid impact is provided. The mat-like structure contains 75-98 percent by volume of voids and is particularly useful on motor vehicles as a material for mud flaps, mud guard lining, and wheel valances. The mat-like structure may be provided with a gutter or deflector so that water draining from the skeletal structure is deflected to one side. The mat-like structure may be made by needle-puching a fibrous web and the fibrous members may randomly be bonded to each other by use of an adhesive or welds.

5 Claims, No Drawings

DEVICE FOR REDUCING SPLASH AND SPRAY FROM VEHICLES

FIELD OF THE INVENTION

This invention relates to a method for reducing splash and spray in regions likely to be subjected to splash and spray and to devices for use therein. In particular, the invention relates to spray reduction means suitable for use with wheeled vehicles; e.g. heavy goods vehicles.

BACKGROUND OF THE INVENTION

The problem of splash and spray from vehicles operating on wet roads is well known and the resultant reduction in visibility for road users in their proximity is a major hazard. The splash and spray is caused by the wheels picking up fluid from the underlying roadway and projecting droplets of fluid by the centripetal force imparted by the revolving wheels. The droplets of fluid impinge at high speed upon the mudguards, flaps or other parts of the vehicle, which causes them to be broken down or atomized into fine droplets, light enough to be carried by the wind or slipstream of the vehicle. The roadway fluids are generally rain, slush, powdered snow, mud or mixtures thereof.

DESCRIPTION OF THE PRIOR ART

Various devices have been tried in an attempt to reduce the splash and spray from vehicles. One type of device comprises enclosing the wheel with mud flaps which hang behind the wheels, and skirts which hang alongside the wheels in an attempt to confine the splash and spray. Such devices are generally unsatisfactory since they provide large solid surfaces against which fluid may be thrown at high speed and atomized, and they tend to cause turbulent airflow surrounding the vehicle by which such atomized droplets may be carried. If such skirts extend downwardly over the sides of the wheels to a large extent they also cause difficulty in installing and removing the wheels.

A second type of device entraps and removes water droplets rather than confining them in the wheel well. U.S. Pat. No. 3,341,222 discloses a mudguard with grooves perforated at their apex so that water thrown from the wheels passes through the perforations and is thus not available to cause spray. While this system is an improvement over a conventional mudguard, its efficiency leaves much to be desired. U.S. Pat. No. 3,899,192 discloses a system of lining wheel arches and flaps with a material comprising a backing section and a plurality of elongate elements secured at one end to the backing section with their other ends projecting outwardly, generally in the direction of the wheel, to form a random tangled mass facing the wheel. An example of such material is stated to be Astroturf®, commerically available from Monsanto Company. Such spray reduction systems are commercially available from Monsanto Company under the registered trademark "Sprayguard".

While the problem of liquid splash and spray is most significant in relation to wheeled vehicles, there are other situations in which it is desirable to reduce liquid splash and spray. Such situations normally arise when liquids fall onto a solid surface and droplets of liquid rebound; e.g. pouring liquid into a funnel, and water from gutters, downpipes and overflows falling onto the ground or concrete surfaces.

SUMMARY OF THE INVENTION

It is an aspect of the present invention to provide a method of reducing splash and spray in regions likely to be subjected to liquid splash and spray and to provide spray reduction means for use therein.

According to one aspect of the present invention there is provided a method of reducing liquid splash and/or spray in a region likely to be subjected to liquid splash and/or spray which comprises introducing into the expected path of said liquid, spray reduction means comprising a non-tufted, non-woven, skeletal mass of fibrous members containing 75 to 98 percent by volume of voids in a mat-like structure.

Liquids striking the spray reduction means used in the invention penetrate the labyrinth without substantial bounce back of droplets from the surface thereby reducing splash and spray. The method is particularly effective for wheeled vehicles and the spray reduction means may readily be secured to a vehicle in the region of the wheels; e.g. as a mudguard lining, mudflap or valance, thereby substantially reducing the spray from the wheels. The method is also effective for reducing splash or spray from any solid surface by securing the spray reduction means to the surface. For example, a layer of the mat-like structure placed inside a funnel effectively prevents splashing or swirling of liquid poured therein no matter how clumsy the operation may be. Furthermore, the exposed surface of gutters, soak-aways and drains may be provided with a layer of the mat-like structure so that water falling on the surface will pass through the mat-like structure without splash back and thereafter drain away normally. This type of arrangement is particularly useful when soil erosion by falling water is a problem. A strip of the mat-like structure on a trench or gutter alongside a building to catch the eavesdrop or runoff will protect the walls of the building from splash-back.

In a preferred embodiment of the invention there is provided a spray reduction means for reducing splash and spray of fluid thrown from the wheels of a vehicle comprising a skeletal structure of non-tufted, non-woven fibrous members randomly bonded together, the structure containing from 75 to 98 percent, preferably above 90 percent, more preferably from 90 to 95 percent, by volume of voids, said structure having a thickness of at least about ⅜ inches (0.95 cm), preferably 0.5 to 1 inch (1.27 to 2.54 cm), and means for securing said structure to the vehicle.

DETAILED DESCRIPTION OF THE INVENTION

The following description is primarily directed to the reduction of spray on wheeled vehicles and means therefor. However, it will be readily appreciated that the mat-like structure described may be used in other spray reducing applications such as those described above.

The structure may be so arranged that the voids are substantially uniformly distributed throughout the thickness of the structure; alternatively the void to solid. ratio may be varied across the thickness of the structure.

The structure is preferably self-supporting and the fibrous members may be randomly bonded to each other.

It has been found that spray reduction means according to the invention are extremely efficient at reducing splash and spray even under severe weather conditions. The skeletal structure provides a labyrinth of voids and droplets of water thrown from the revolving wheel give up their kinetic energy relatively slowly as they penetrate into the labyrinth, thus there is no bounce back of fine water droplets from the surface, and any bouncing within the skeletal structure is suppressed since there is no straight exit path for the droplets. It is desirable that the fibers do not have a greater diameter than 0.5 mm as when this is exceeded, impinging droplets would tend to bounce back from the surface of the fiber rather than penetrating into the labyrinth. Preferably the fibers are substantially round in cross-section. The skeletal structure has a high void ratio and the entrapped water may freely drain away from the surface of the web thereby removing the water from the vicinity of the wheel and preventing saturation or flooding of the device.

The non-tufted, non-woven structure used in the present invention has proved to be more efficient than tufted structures of the type disclosed in U.S. Pat. No. 3,899,192. Tufted structures; i.e. those structures in which elongate elements are attached at one end to a support backing and have a free end, tend to have a smaller volume of voids at the exposed surface, due to the free ends of the fibers or elongate blades bending and tangling, which may lead to surface flooding of the structure. Furthermore, the elongate blade-like elements may present a sufficient area of flat surface to cause substantial bounce back of the water droplets.

The spray reduction means may take the form of a lining to a mudguard or that portion of a vehicle surrounding the wheels. The lining may be secured by any suitable fixing means; e.g. adhesives, clips, bolts, screws, wires, etc. The structure of the spray reduction means may be bonded to a backing; e.g. a thin metal, preferably aluminum, or plastics sheet, mesh, or scrim, in order to facilitate securing to the vehicle by screws or bolts.

The spray reduction means of the invention may also take the form of a mudflap which may be positioned forwardly or rearwardly of the wheels and preferably extending at least the width of the wheel and depending close to the road surface. On some vehicles; e.g. coaches, the flap may be positioned at the rear of the vehicle and extend the full width thereof. The mudflaps may have a solid backing although preferably the structure has a sufficiently high tensile strength so as to be substantially self-supporting. The structure may be secured to an open frame assembly; e.g. a conventional U-shaped retaining frame. The advantages of using mudflaps without a backing support member is that the flaps are considerably lighter than many of the solid flaps currently available and the open skeletal structure allows free flow of air around the wheel and tire thereby exerting a cooling action on both the tire and the associated braking means of the tire.

The base of the mudflap may conveniently be provided with a gutter or deflector extending across the width of the flap so that water draining through the skeletal structure is collected and/or deflected to one side of the path of any following wheels of the vehicle.

The spray reduction means may also take the form of curtains or valances which are generally positioned at the sides of the wheels. Such curtains or valances preferably include a solid backing; e.g. metal, preferably aluminum, or plastics sheet, and are arranged so that the skeletal structure faces the wheel. Preferably the valances overhang the top of the tires by at least one inch (2.5 cm). The valances or curtains may also be hung from the sides of vehicles between sets of wheels to absorb spray and act as a side guard to prevent pedestrian access under the vehicle. The valances may conveniently be secured to the body of the vehicle by bolts or clips. The valances may also be provided with gutters or deflectors in a similar manner to the mudflaps.

A preferred form of the mat-like structure consists of resilient springy fibrous members randomly bonded to each other, the individual fibrous members of the structure generally having a length of between 0.5 and 4 inches (1.27 to 10.2 cm), preferably from 1.5 to 3 inches, (3.81 to 8.12 cm), to best provide the uniform, loose, open, interlocked skeletal structure that is required. Fibrous members which are as short as about 0.25 inch (0.64 cm) do not readily interlock to form a relatively thick, three dimensional porous skeletal structure but tend to form a dense mat. If the fibrous members exceed 4 inches (10.2 cm) in length, they are quite useful, but tend to snarl and interfere with the desired uniformity of the finished product.

The diameter of the fibrous members is preferably not less than about 25 microns and not more than about 250 microns. Fibrous members having substantially smaller effective diameters (for example, cotton fibers) tend to form a tightly bonded high density "felted" structure. Fibrous members having diameters as large as 250 microns act more like jackstraws than interlocking skeleton-forming members and the distribution of void spaces may be erratic and non-uniform. Larger diameter fibers become increasingly undesirable, and if very large, may present a surface area sufficient to cause atomization of impinging drops of water.

It is also desirable that at least a substantial number of the fibrous members be "crimped" (that is curly), resilient and springy, having the ability to form a three dimensional structure, rather than merely a thick membraneous structure. Fibers which lack resilience tend to mat together and form flat membranes, such as are typically present in a cotton carding operation.

The fibers used in the skeletal structure preferably comprise nylon or polyethylene terephthalate filaments of from 5 to 60 denier per filament.

The skeletal structure may be prepared, for example, using a machine commercially available under the trade name Rando-Webber. For example, 36 inch (0.91 m) random fibrous matting having a continuous non-woven skeletal structure, a finished thickness of 0.5 inch (1.27 cm) and a weight of 1.6 oz. per square yard (54 g/m$^2$) has been prepared from 15 denier nylon filament segments having a length of about 1.5 inches (3.81 cm) and a diameter of about 45 microns. The volume percentage of voids in such a material is of the order of 98 percent. Reference is directed to British Patent Specification No. 884 204 which discloses the preparation of such non-woven skeletal structures which are thereafter treated with adhesive and abrasive particles to produce an abrasive article.

The fibrous members may randomly be bonded to each other by use of an adhesive or by welds.

To increase the mechanical strength of the device while maintaining the reduced likelihood of surface flooding, it may be desirable to form a composite skeletal structure in which a structure with approximately 98 percent void by volume is laminated to a structure with a substantially lower ratio of, say 75 percent. In another embodiment, the distribution of voids is so arranged that the ratio of void volume diminishes across the thickness of the structure, there being a greater volume of voids at the face at which the fluid enters the structure.

The structure may also be reinforced internally by one or more reinforcing elements; e.g. rods, wires, mesh, etc., preferably of plastics or metal. Such a reinforced structure may be obtained by laminating two layers of the mat-like structure together with the reinforcing element(s) therebetween. Metal reinforcing elements, more particularly a metal mesh, are preferred since the resulting material possesses high mechanical strength and may be permanently deformed by simple bending, to a desired shape; e.g. to conform with the contours of a mudguard. The reinforced mat-like structures form a separate aspect of the invention.

The following tests were conducted to determine the spray reduction characteristics of material suitable for use in the invention compared with other known materials.

TEST 1

Drops of water were allowed to fall from a height of about 8 feet (2.4 m) onto the following surfaces:
(a) a metal sheet,
(b) Nomad ® sheet (Nomad ® is a brand of floor matting commercially available from Minnesota Mining and Manufacturing Company consisting of a mass of tangled filaments of a rubber-like material (¼ inch (0.64 cm) thick) fixed upon a resilient base (⅛ inch (0.32 cm) thick), and
(c) a sheet of Scotchbrite ® web (Scotchbrite ® is a brand of abrasive material—the floor stripping grade was utilized—made by Minnesota Mining and Manufacturing Company, consisting of a non-woven skeletal structure).

The water droplets broke up in many fine droplets when striking the metal, yet did not at first when striking the Nomad ® matting. However, the Nomad ® matting did not readily drain and soon water-to-water collisions on the surface caused smashing of the falling drops. With the Scotchbrite ® material, which is a spray reduction means in accordance with the invention, the falling drops readily drained and no secondary droplets were observed.

In order to examine the effect of individual elements upon moving drops of water, a similar test was conducted in which drops of water were allowed to fall about three feet onto the following elements:
1. a blade of polyethylene approximately 2 mm×20 mm with the flat surface uppermost, angled at 30° to the horizontal,
2. a blade as above, but horizontal,
3. a substantially round fiber of diameter approximately 1.25 mm,
4. a substantially round fiber of diameter approximately 0.6 mm,
5. a substantially round fiber of diameter approximately 0.45 mm,
6. a substantially round fiber of diameter approximately 0.25 mm,
7. a substantially round fiber of diameter approximately 0.2 mm,
8. a substantially round but crimped fiber of diameter approximately 0.2 mm.

Water drops striking the polyethylene blades (1) and (2) broke up and bounced back as many fine droplets. Substantially less bounce back was noted for fibers (3) and (4), and negligible bounce back from the remaining fibers (5) to (8).

The tests indicate that the surface area of the elements should be small to prevent "bounce back" of water droplets.

TEST 2

A trailer carrying a water tank was towed and water sprayed onto the road ahead of each wheel. Interchangeable mudguards allowed direct comparison of various materials. Scotchbrite ® web was found to be more effective than the other materials tested in Test 1.

TEST 3

A motor car was supported upon stands with the rear (driven) wheels just dipping into trays of water. The wheels were revolved and water was thrown into the wheel arches and to the rear of the car. A liner of each test material was fitted to one of the wheel arches, and at various lengths as a mud flap to the rear of the wheel. Nomad ®, Scotchbrite ® and Sprayguard ® materials were tested and Scotchbrite ® web was found to be as effective as Sprayguard ® material under conditions up to moderate wetting, and more efficient than Sprayguard ® material where waterflow was heavy since the Sprayguard ® material became flooded upon its surface as water could not drain away sufficiently fast.

TEST 4

The material to be tested was supported vertically and water sprayed from a hose onto its surface. From hard or resilient surfaces much bounce back was noted. There was no bounce back from Scotchbrite ® web. When Sprayguard ® material was tested it was found that at low water velocity there was negligible bounce back but at higher water velocities bounce back increased significantly; at heavy waterflow Sprayguard ® material flooded and bounce back was severe.

TEST 5

An attempt was made to blow water through Scotchbrite ® web with a stream of air, but negligible water passed through the web.

The following Table 1 is a summary of the physical properties of Scotchbrite ® and Sprayguard ® materials.

TABLE 1

|  | Scotchbrite ® (floor stripping) | Sprayguard ® |
| --- | --- | --- |
| Construction | A woven mass of fibers laid along the length of the mat-like composition, about 1.5 cm thick. | Blades, each about 2 cm of plastic fixed at one end to a sheet, so that all the blades were predominately at right angles to the sheet, all bonded to a 0.5 cm thick plastic sheet. |
| Tensile Strength | A section of about 3 square cm supports 10 kgms. | Not applicable as the backing sheet is very strong and semi-rigid. |
| Weight | Ca. 0.24 gm/sq. cm. | Ca. 0.82 gm/sq. cm (complete composite) |

TABLE 1-continued

| | Scotchbrite ® (floor stripping) | Sprayguard ® |
|---|---|---|
| Solids/Free space ratio | Ca. 1:15 - 94% void volume | Ca. 1:3 (complete composite) 75% void volume |

The following road test was conducted to assess the effectiveness of the spray reduction means of the invention when fitted to a vehicle.

Two articulated heavy goods vehicles were used, both of which were of the maximum width and length normally permitted on United Kingdom roads, with box trailers 14 feet (4.27 meters) high. One vehicle was fitted with conventional metal and rubber mudguards and flaps and used as a control. The second vehicle was equipped with spray reduction means of the invention as follows.

The tractor (cab) was equipped by lining its wheel arches with Scotchbrite ® material (hereinafter referred to as the "mat") approximately ½ inches (1.3 cm) thick and of approximately 93 percent voids. The surfaces of the mudflaps facing the wheel were also covered with the mat. The trailer had side valances of the mat attached at the side of each wheel, extending from the floor of the trailer to a point level with the upper part of the tire. Flaps of the mat were hung from the floor of the trailer at the front of the wheels, between them, and to the rear of the wheels in the place of conventional mudflaps. Above each wheel a layer of the mat was affixed to the underside of the trailer.

Other methods of fixing the spray reduction means of this invention to trailers are available. Valances may be secured to the underside of the trailer by means of angle irons. Flaps are suspended from angle irons which are secured to the underside of the trailer, and are themselves secured to U-shaped retaining frames by means of U-shaped bolts. The base of the flap is fitted with a gutter for collecting and deflecting water which drains through the skeletal structure of the flap to one side of the path of following wheels. The gutter is a tube with an axial slit which encloses the bottom of the mat. Liquid passes through the mat and into the tube.

Both vehicles were driven at various speeds over a wet roadway and the spray patterns from each observed and visually recorded.

At speeds below 30 mph (13.4 ms$^{-1}$) the spray from the equipped vehicle was substantially less than from the control vehicle.

At speeds up to 45 mph (20.1 ms$^{-1}$) the reduction in spray from the equipped vehicle was still substantial, estimated by observers to be a 50 percent reduction. Drivers of following vehicles reported improved visibility and less difficulty in overtaking the equipped vehicle than the control vehicle.

As the speeds were progressively increased the turbulence caused by the passage of the vehicle became predominant in causing spray and the spray reducing effects of the equipped vehicle were proportionally reduced, although spray generated directly from the vehicle tires was still substantially reduced.

At 60 mph (26.8 ms$^{-1}$), the reduction of spray was still significant. The driver of the following car reported superior visibility while traveling at the rear of the equipped vehicle. Drivers of the heavy goods vehicles reported that there was an improvement in visibility when using their rear view mirrors in the equipped vehicle compared to the control vehicle, as the spray generated from the equipped vehicle hangs closer to the roadway than that generated from the control vehicle.

The wheel arches of the tractor and the remaining wheels of the trailer may be fitted with side valances of Scotchbrite ® material to further improve spray reduction and hence visibility.

I claim:

1. A vehicle which moves with wheels in contact with the ground having attached thereto a device for reducing splash, spray and bounce back of fluid thrown from the wheels of said vehicle, said device comprising a non-tufted, non-woven sketetal mass of bonded, resilient fibrous members containing 75 to 98 percent by volume of voids in a mat-like structure of thickness at least about 0.95 cm and in which the distribution of voids is so arranged that the ratio of void volume diminishes across the thickness of the structure, there being a greater volume of voids at the face at which fluid enters the structure.

2. A vehicle which moves with wheels in contact with the ground having attached thereto a device for reducing splash, spray and bounce back of fluid thrown from the wheels of said vehicle, said device comprising a non-tufted, non-woven skeletal mass of bonded, resilient fibrous members containing 75 to 98 percent by volume of voids in a mat-like structure of thickness at least about 0.95 cm and in which the skeletal structure comprises fibers having an approximately circular cross-section, the diameters of which are no greater than 0.5 mm.

3. A vehicle which moves with wheels in contact with the ground having attached thereto a device for reducing splash, spray and bounce back of fluid thrown from the wheels of said vehicle, said device comprising a non-tufted, non-woven sleletal mass of bonded, resilient fibrous members containing 75 to 98 percent by volume of voids in a mat-like structure of thickness at least about 0.95 cm and in which the fibrous members of the skeletal structure have an approximately circular cross-section, a length of from 1.2 to 10.2 cm, and a diameter from 25 to 250 microns.

4. A vehicle which moves with wheels in contact with the ground having attached thereto a device for reducing splash, spray and bounce back of fluid thrown from the wheels of said vehicle, said device comprising a non-tufted, non-woven skeletal mass of bonded, resilient fibrous members containing 75 to 98 percent by volume of voids in a mat-like structure of thickness at least about 0.95 cm and in which the fibrous members have a diameter of from 25 to 250 microns.

5. A vehicle which moves with wheels in contact with the ground having attached thereto a device for reducing splash, spray and bounce back of fluid thrown from the wheels of said vehicle, said device comprising a non-tufted, non-woven skeletal mass of bonded, resilient fibrous members containing 90 to 98 percent by volume of substantially uniformly distributed voids in a mat-like structure of thickness at least about 0.95 cm, and in which the fibrous members of skeletal structure have a length from 1.2 to 10.2 cm and a diameter from 25 to 250 microns.

* * * * *